United States Patent Office 3,531,309
Patented Sept. 29, 1970

3,531,309
COMPOSITIONS COMPRISING 1 - CYANO - 2,3-
PHTHALOYL - 7,8 - BENZOPYRROCOLINES
AND A CARRIER
Lester Weinberger, Rochester, N.Y., assignor to Xerox
Corporation, Rochester, N.Y., a corporation of New
York
No Drawing. Original application Apr. 2, 1965, Ser. No.
445,235, now Patent No. 3,402,177, dated Sept. 17,
1968. Divided and this application Nov. 21, 1967, Ser.
No. 709,511
Int. Cl. C08k 1/52; C08h 17/26
U.S. Cl. 106—193        3 Claims

ABSTRACT OF THE DISCLOSURE

A composition comprising yellow pigments of 1-cyano-2, 3-phthaloyl-7, 8-benzopyrrocolines and carriers.

---

This is a division of application Ser. No. 445,235, filed in the United States, Apr. 2, 1965, now Pat. No. 3,402,-177.

This invention relates to new compositions and to their manufacture and use. It is particularly directed to new pigments which have an intense yellow-orange color.

Many yellow-orange pigments, both organic and inorganic are known and used in the prior art. While the known pigments are generally useful, the individual pigments generally have different specific undesirable characteristics. Inorganic pigments, as a class, generally exhibit high resistance to light, water, alcohol and oils, but have poor dispersing properties. For example, cadmium yellow has high resistance to light, heat and alkalies, but low resistance to acids. Chrome yellows and oranges are extensively used today due to their low cost and good resistance to water, oils, and alcohol. However, they have low resistance to acids and alkalies and are discolored by hydrogen sulfide vapors. Molybdate oranges generally have an especially bright, clean color and low cost but are susceptible to discoloration by alkalies. Organic pigments, while generally higher in cost and lower in resistance to degrading influences, generally have dispersing and working characteristics superior to inorganic pigments. A great many organic yellow-orange pigments are known. The following pigments are typical. Natural yellow pigments such as quercitron yellow, are little used today because of their generally high cost. Azo and diazo colors such as Persian orange and Hansa yellows generally have clean brilliant colors, variable light fastness, and low resistances to acids. Nitro colors such as Naphtho yellow S generally have good color but low light resistance and a tendency to bleed when in contact with water. Ketonimides and hydrazides such as auramine and tartrazine generally have moderate light and heat resistance and are non-bleeding in oils but are sensitive to acids and alkalies. Benzidines have generally high tinctorial strength and cost but low light fastness. Indanthrenes generally lack brilliance and tinctorial strength but are among the most permanent organic known pigments. Other organic lakes such as alizarines, anthosines, and eosines have widely varying characteristics. As is apparent from the above discussion, most pigments, organic and inorganic, have both desirable and undesirable characteristics. Thus, there is a continuing need for improved pigments having good resistance to degradation, good dispersing characteristics and brilliant, clean colors.

It is therefore an object of this invention to provide novel pigments which substantially overcome the above-noted deficiencies.

It is a further object of this invention to provide novel compositions having an intense yellow-orange color.

It is a still further object of this invention to provide new pigmented coating and molding compositions.

The foregoing objects and others are accomplished in accordance with this invention, basically, by providing novel compositions having the general formula:

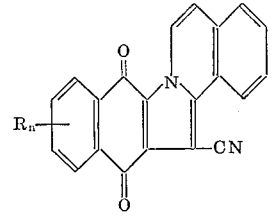

wherein: the R's are each selected from the group consisting of nitro, acetamido, cyano, lower alkoxy, amino and halo radicals, and $n$ is a positive integer from 1 to 3.

The compositions of the general formula given above belong to the general class of substituted 1-cyano-2,3-phthaloyl-7,8-benzopyrrocolines. These compositions may be made by reacting isoquinoline and ethylcyanoacetate with a suitable substituted 2,3-dichloro-1,4-naphthoquinone having the general formula:

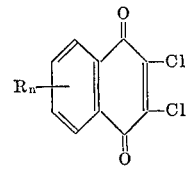

wherein: the R's are each selected from the group consisting of nitro, acetamido, cyano, lower alkoxy, amino and halo radicals, and $n$ is a positive integer from 1 to 3, The compositions of this invention have the common characteristics of a brilliant, intense yellow-orange color and of insolubility in water and the common organic solvents, e.g. benzene, toluene, acetone, carbon tetrachloride, chloroform, alcohols, and aliphatic hydrocarbons, and thus may be dispersed in the usual paint and ink vehicles without dissolving excessively. They are, however soluble in hot dimethyl formamide and anisole.

Of the compositions within the general formula given above, those substituted with nitro or acetamido groups are preferred, since they have the most desirable combination of purity, brilliance and intensity of color and durability when used in a coating composition. Of these, optimum results have been obtained with 1-cyano-2,3-(3′-nitro)-phthaloyl-7,8-benzopyrrocoline and 1-cyano-2,3-(3′-acetamido)-phthaloyl-7,8-benzopyrrocoline. Since the shade or tone of the pigments of this invention vary slightly depending upon the substituent, intermediate shades or tones may be obtained by mixing several of the pigments, while retaining the other desirable properties these compositions enjoy as a group. It has been found that the 1-cyano-2,3-phthaloyl - 7,8 - benzopyrrocolines when substituted as described above have properties much superior to the unsubstituted compounds.

The following examples further define and describe methods of making the compositions of the present invention. Parts and percentages are by weight unles otherwise indicated. The examples below should be considered

EXAMPLE I

About 12 parts 5-nitro-2,3-dichloro-1,4-naphthoquinone is dissolved in about 100 parts ethanol. About 25 parts of isoquinoline and about 16 parts ethylcyanoacetate are added thereto. The solution is brought to a boil and refluxed for about 20 minutes. The solution is filtered hot and the precipitate is recrystallized from dimethylformamide, then recrystallized from anisole. The product has a yellow-orange color and a melting point of 365–9° C. The product is 1-cyano-2,3-(3'-nitro)-phthaloyl-7,8-benzopyrrocoline.

EXAMPLE II

About 9 parts 5-acetamido-2,3-dichloronaphthoquinone is dissolved in about 100 parts ethanol. About 11.5 parts ethylcyanoacetate and about 18 parts isoquinoline are added to the solution. The solution is brought to a boil and maintained at reflux for about 20 minutes. The solution is filtered hot to remove the yellow-orange precipitate. The product is recrystallized first from dimethyl formamide, then from anisole. The product, 1-cyano-2,3-(3'-acetamido)-phthaloyl-7,8-benzopyrrocoline, has a melting point of about 374–5° C.

EXAMPLES III–XXX

In Examples III–XXX, the product is produced by the process of Example I, with the 5-nitro-2,3-dichloronaphthoquinone replaced by the appropriate reactant. In the table which follows, column 1 lists the number of the example, column 2 lists the parts by weight of the naphthoquinone reactant, column 3 lists the naphthoquinone reactant, and column 4 lists the product.

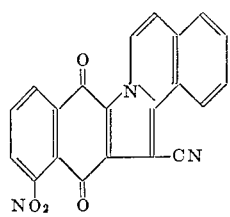

prepared as in Example I above, is gradually added to about 100 parts of a vinyl resin varnish, containing 20 percent Vinylite XYHL, a vinyl resin, available from Union Carbide Corp., 40 percent nitroethane and 40 percent xylol, in a mixing vessel with mild agitation. After the pigment is uniformly dispersed in the carrier, the composition is coated onto a steel panel, as by brushing, spraying or dipping and air dried. Upon examination, the coated surface is found to have an intense, brilliant yellow-orange color and a hard durable surface.

EXAMPLE XXXII

A cellulose nitric coating composition is prepared by combining the following ingredients: About 8 parts of 1-cyano - 2,3 - (3' - acetamido)-phthaloyl - 7,8 - benzopyrrocoline having the structure:

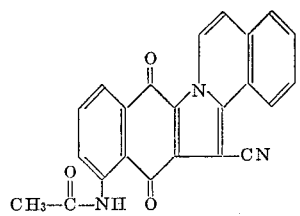

TABLE I

| 1 | 2 | 3 | 4 |
|---|---|---|---|
| III | 16 | 5-iodo-2,3-dichloro-1,4-naphthoquinone | 1-cyano-2,3-(3'-iodo)-phthaloyl-7,8-benzopyrrocoline. |
| IV | 11.5 | 2,3,6-trichloro-1,4-naphthoquinone | 1-cyano-2,3-(4'-chloro)-phthaloyl-7,8-benzopyrrocoline. |
| V | 11.0 | 7-methoxy-2,3-dichloro-1,4-naphthoquinone | 1-cyano-2,3-(6'-methoxy)-phthaloyl-7,8-benzopyrrocoline. |
| VI | 11.0 | 5-cyano-2,3-dichloro-1,4-naphthoquinone | 1-cyano-2,3-(3'-cyano)-phthaloyl-7,8-benzopyrrocoline. |
| VII | 13.5 | 5-bromo-2,3-dichloro-1,4-naphthoquinone | 1-cyano-2,3-(3'-bromo)-phthaloyl-7,8-benzopyrrocoline. |
| VIII | 12.0 | 6-ethoxy-2,3-dichloro-1,4-naphthoquinone | 1-cyano-2,3-(4'-ethoxy)-phthaloyl-7,8-benzopyrrocoline. |
| IX | 12.0 | 7-nitro-2,3-dichloro-1,4-naphthoquinone | 1-cyano-2,3-(5'-nitro)-phthaloyl-7,8-benzopyrrocoline. |
| X | 12.5 | 8-cyano-2,3-dichloro-1,4-naphthoquinone | 1-cyano-2,3-(6'-cyano)-phthaloyl-7,8-benzopyrrocoline. |
| XI | 11.0 | 5-amino-2,3-dichloro-1,4-naphthoquinone | 1-cyano-2,3-(3'-amiono)-phthaloyl-7,8-benzopyrrocoline. |
| XII | 11.0 | 7-fluoro-2,3-dichloro-1,4-naphthoquinone | 1-cyano-2,3-(5'-flouro)-phthaloyl-7,8-benzopyrrocoline. |
| XIII | 11.5 | 5,8-diamino-2,3-dichloro-1,4-naphthoquinone | 1-cyano-2,3-(3',6'-diamino)-phthaloyl-7,8-benzopyrrocoline. |
| XIV | 14.0 | 6,7-dinitro-2,3-dichloro-1,4-naphthoquinone | 1-cyano-2,3-(4'-5'-dinitro)-phthaloyl-7,8-benzopyrrocoline. |
| XV | 17.0 | 6,8-dibromo-2,3-dichloro-1,4-naphthoquinone | 1-cyano-2,3-(4'-6'-dibromo)-phthaloyl-7,8-benzopyrrocoline. |
| XVI | 14.0 | 5,7-dimethoxy-2,3-dichloro-1,4-naphthoquinone | 1-cyano-2,3-(3'-5'-dimethoxy)-phthaloyl-7,8-benzopyrrocoline. |
| XVII | 14.0 | 5-nitro-6-methoxy-2,3-dichloro-1,4-naphthoquinone | 1-cyano-2,3-(3'-nitro-4'-methoxy)-phthaloyl-7,8-benzopyrrocoline. |
| XVIII | 13.5 | 5,7-dicyano-2,3-dichloro-1,4-naphthoquinone | 1-cyano-2,3-(3'5'-dicyano)-phthaloyl-7,8-benzopyrrocoline. |
| XIX | 12.0 | 6-cyano-7-amino-2,3-dichloro-1,4-naphthoquinone | 1-cyano-2,3-(4'-cyano-5'-amino)-phthaloyl-7,8-benzopyrrocoline. |
| XX | 13.0 | 6-amino-7-acetamido-2,3-dichloro-1,4-napthoquinone | 1-cyano-2,3-(4'-amino-5'-acetamido)-phthaloyl-7,8-benzopyrrocoline. |
| XXI | 14.5 | 5-nitro-8-acetamido-2,3-dichloro-1,4-naphthoquinone | 1-cyano-2,3-(3'-nitro-6'-acetamido)-phthaloyl-7,8-benzopyrrocoline. |
| XXII | 13.5 | 5,6-diamino-7-nitro-2,3-dichloro-1,4-naphthoquinone | 1-cyano-2,3-(3',4'-diamino-5'-nitro)-phthaloyl-7,8-benzopyrrocoline. |
| XXIII | 18.5 | 5,8-dibromo-6-methoxy-2,3-dichloro-1,4-naphthoquinone | 1-cyano-2,3-(3',6'-dibromo-4'-methoxy)-phthaloyl-7,8-benzopyrrocoline. |
| XXIV | 15.0 | 5-ethyl-7,8-dimethyl-2,3-dichloro-1,4-naphthoquinone | 1-cyano-2,3-(3'-ethyl-5',6'-dimethyl)-phthaloyl-7,8-benzopyrrocoline. |
| XXV | 12.0 | 5,6,7-triamino-2,3-dichloro-1,4-naphthoquinone | 1-cyano-2,3-(3',4',5'-triamino)-phthaloyl-7,8-benzopyrrocoline. |
| XXVI | 17.5 | 6,7,8-triacetamido-2,3-dichloro-1,4-naphthoquinone | 1-cyano-2,3-(4',5',6'-triacetamido)-phthaloyl-7,8-benzopyrrocoline. |
| XVII | 16.0 | 5,7,8-trinitro-2,3-dichloro-1,4-naphthoquinone | 1-cyano-2,3-(3',5',6'-trinitro)-phthaloyl-7,8-benzopyrrocoline. |
| XXVIII | 15.0 | 5-nitro-6-amino-8-acetamido-2,3-dichloro-1,4-naphthoquinone | 1-cyano-2,3-(3'-nitro-4'-amino-6'-acetamido)-phthaloyl-7,8-benzopyrrocoline. |
| XXIX | 14.5 | 5-amino-6-propoxy-2,3-dichloro-1,4-naphthoquinone | 1-cyano-2,3-(3'-amino-4'-propoxy)-phthaloyl-7,8-benzopyrrocoline. |
| XXX | 16.5 | 5,8-dinitro-6-acetamido-2,3-dichloro-1,4-naphthoquinone | 1-cyano-2,3-(3',6'-dinitro-4'-acetamido)-phthaloyl-7,8-benzopyrrocoline. |

The compositions of this invention are especially useful as pigments for coloring paints, varnishes, and other coating and molding compositions. For such uses, the pigment generally must be in finely powdered form. The particles may be reduced to a fine powder by dispersing the material in a hydrocarbon liquid and ball milling for about 48 hours.

The following examples further define typical uses for the compositions of the present invention.

EXAMPLE XXXI

About 100 parts of 1-cyano-2,3-(3'-nitro)-phthaloyl-7,8-benzopyrrocoline, having the structure:

prepared as in Example II above, about 10 parts of cellulose nitrate, about 20 parts of a non-drying alkyd resin containing about 60 percent solids, about 2 parts dibutylthalate, about 1 part blown castor oil, about 20 parts butylacetate, about 20 parts toluol, and about 10 parts butyl alcohol. This coating is prepared by dispersing the pigment in the resin-plasticizer portion of the final mixture together with sufficient solvent to permit working the mass in a ball mill. The remaining ingredients are then incorporated by simple agitation in a paddle mixer to get a homogeneous product. Steel panels coated with the resulting yellow-orange lacquer have a brilliant, intense yellow color and good adherence and durability characteristics.

EXAMPLE XXXIII

A pigmented polystyrene material suitable for use as a coating or molding composition is prepared as follows: a mixture of about 100 parts polystyrene and about 30 parts 1-cyano-2,3-(5′-amino) - phthaloyl-7,8 - benzopyrrocoline having the structure:

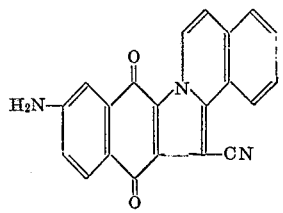

synthesized as in Example XI above is prepared by milling the ingredients on hot rolls for about 20 minutes at a temperature of about 170°–200° C. This concentrate is removed from the rolls as a sheet, cooled and ground to a powder. About 2 parts of the ground concentrate and about 10 parts of polystyrene dissolved in about 90 parts of a monomeric styrene and the mixture is poured into a cylindrical container. The container is placed in a heating chamber with its long axis in a vertical direction and the styrene is polymerized by heating at a temperature of about 80° C. for about 70 hours, then raising the temperature to about 200° C. and heating for about an additional 48 hours to complete the polymerization. After polymerization, the product is removed from the container as a single block of pigmented polystyrene and cut into sections. Inspection shows a uniform distribution of the insoluble pigment throughout the entire mass of polystyrene. The resulting bright yellow-orange colored sheets of polystyrene may be useful as sheets, may be further reshaped into commercial products, or may be ground to a powder and molded by conventional molding techniques.

In addition to the specific uses listed in the above examples, it has been found that the compositions of this invention may be dispersed in other natural and synthetic resins resulting in yellow-orange compositions suitable for coating and molding processes. Any suitable carrier resin may be used. Typical resins include balsam resins, phenol resins, phenol resins modified with colophony and other resins, of which colophony constitutes a major part, coumarone resins and indine resins and the substances covered by the collective term "synthetic lacquer resins" which include processed natural substances, such as cellulose ether; polymers such as polyvinylchlorides, polyvinylacetate, polyvinylacetals, polyvinylethers, polyacrylic and polymethacrylic esters, polystyrene and isobutylene; polycondensates, e.g. polyesters such as phthalate resins, alkyd resins, maleic acid resins, phenolformaldehyde resins, ureaformaldehyde resins, melamine formaldehyde condensates, aldehyde resins, ketone resins, xylene formaldehyde resins, polylactams, and polyamides; epoxy resins; polyadducts, such as polyurethanes; and suitable mixtures or copolymers thereof.

The compositions of this invention are further useful as pigments in paper making processes when a yellow colored paper is desired. The pigments of this invention may also be dispersed in synthetic filament forming materials useful in the production of synthetic textiles. The compositions have further uses in certain insecticides, herbicides and fungicides. The photosensitive characteristics of these compounds, e.g. their ability to hold an electrostatic charge in the dark and dissipate it in the light, makes them also useful in various electrophotographic imaging processes. The compositions and/or yellow-orange pigments of this invention may have other materials mixed therewith to enhance, synergize or otherwise modify their properties.

Although specific materials and conditions were set forth in the above exemplary processes of making and using the compounds of this invention, these were merely meant as illustrations of the present invention. Various other carriers, substituents and uses such as those listed above, and various conditions may be substituted for those in the examples with similar results. Many other modifications of the present invention will occur to those skilled in the art upon reading the present disclosure; these are intended to be encompassed within the spirit of this invention.

What is claimed is:

1. A coating composition comprising a hardenable carrier having dispersed therein a pigmenting amount of the compound having the general formula:

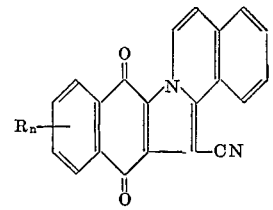

wherein:

the R's are each selected from the group consisting of nitro, acetamido, cyano, lower alkoxy, amino and halo radicals and $n$ is a positive integer from 1 to 3.

2. A coating composition comprising a hardenable carrier having dispersed therein a pigmenting amount of 1-cyano-2,3-(3′-nitro)-phthaloyl-7,8-benzopyrrocoline.

3. A coating composition comprising a hardenable carrier having dispersed therein a pigmenting amount of 1-cyano-2,3-(3′-acetamido) - phthaloyl - 7,8 - benzopyrrocoline.

References Cited

UNITED STATES PATENTS 3,402,177  9/1968  Weinberger _____ 260—287
3,328,410  6/1967  Inman et al. _____ 260—287

MORRIS LIEBMAN, Primary Examiner

T. MORRIS, Assistant Examiner

U.S. Cl. X.R.
260—41